(12) United States Patent
Patrick

(10) Patent No.: US 11,400,855 B2
(45) Date of Patent: Aug. 2, 2022

(54) INTEGRATED TAILGATE CARGO SYSTEM FOR AUTOMOTIVE VEHICLE

(71) Applicant: Rivian IP Holdings, LLC, Plymouth, MI (US)

(72) Inventor: Lindsey Patrick, Clarkston, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 221 days.

(21) Appl. No.: 16/915,220

(22) Filed: Jun. 29, 2020

(65) Prior Publication Data
US 2021/0402911 A1  Dec. 30, 2021

(51) Int. Cl.
*B60P 7/08* (2006.01)
*B62D 33/027* (2006.01)

(52) U.S. Cl.
CPC ........ *B60P 7/0815* (2013.01); *B62D 33/0273* (2013.01)

(58) Field of Classification Search
CPC .......... B60P 7/08; B62D 33/027; B62D 33/07
USPC ................................................. 224/324, 319
See application file for complete search history.

(56) References Cited

U.S. PATENT DOCUMENTS

| | | | | |
|---|---|---|---|---|
| 4,852,779 | A * | 8/1989 | Berg | B60R 9/10 224/42.32 |
| 7,699,373 | B2 * | 4/2010 | Miller | B60P 3/40 296/50 |
| 7,857,177 | B2 * | 12/2010 | Reeves | B60R 9/10 224/403 |
| 7,959,388 | B2 * | 6/2011 | Van Keeken | B62H 3/04 410/11 |
| 9,902,306 | B1 * | 2/2018 | Foss | B60P 1/435 |
| 2017/0274940 | A1 * | 9/2017 | Povinelli | B60R 3/02 |
| 2019/0016270 | A1 * | 1/2019 | Nordström | B60R 9/048 |

* cited by examiner

*Primary Examiner* — D Glenn Dayoan
*Assistant Examiner* — Sunsurraye Westbrook
(74) *Attorney, Agent, or Firm* — Clements Bernard Baratta; Christopher L. Bernard

(57) ABSTRACT

Various disclosed embodiments include systems for securing cargo to a dropdown tailgate of an automotive vehicle, systems for securing a bicycle to a dropdown tailgate of an automotive vehicle, and systems for securing cargo to a tailgate of an automotive vehicle. In an illustrative embodiment, a system for securing cargo to a dropdown tailgate of an automotive vehicle includes: a dropdown tailgate including a first elongated groove running along an inner panel of the dropdown tailgate; a first securing member, the first securing member including a first elongated arm; the first securing member being configured to be inserted into the first elongated groove, the received portion of the first securing member being slidingly moveable to a selectable position in the first elongated groove; and a first attachment mechanism, the first attachment mechanism being configured to secure the securing member to the first elongated groove.

20 Claims, 3 Drawing Sheets

INTEGRATED TAILGATE CARGO SYSTEM FOR AUTOMOTIVE VEHICLE

INTRODUCTION

The present disclosure relates to tailgates and systems for securing cargo at a cargo space.

The statements in this section merely provide background information related to the present disclosure and may not constitute prior art.

A variety of cargo-securing devices or systems are commercially available for automotive vehicles, including cargo bed strap or rail systems, roof-mounted systems, and racks such as bike racks which attach to a trailer hitch or to a trunk of an automotive vehicle. However, existing cargo-carrying devices or systems can interfere with other features of an automotive vehicle, such as occupying or interfering with a trailer hitch or interfering with access to cargo space.

BRIEF SUMMARY

Various disclosed embodiments include systems for securing cargo to a dropdown tailgate of an automotive vehicle, systems for securing a bicycle to a dropdown tailgate of an automotive vehicle, and systems for securing cargo to a tailgate of an automotive vehicle.

In an illustrative embodiment, a system for securing cargo to a dropdown tailgate of an automotive vehicle includes: a dropdown tailgate including a first elongated groove running along an inner panel of the dropdown tailgate; a first securing member, the first securing member including a first elongated arm; the first securing member being configured to be inserted into the first elongated groove, the received portion of the first securing member being slidingly moveable to a selectable position in the first elongated groove; and a first attachment mechanism, the first attachment mechanism being configured to secure the securing member to the first elongated groove.

In another illustrative embodiment, a system for securing a bicycle to a dropdown tailgate of an automotive vehicle includes: a dropdown tailgate including a member having a first elongated groove, the first elongated groove running transversely along an inner panel of the dropdown tailgate; a first securing member for securing a first wheel of a bicycle, the first securing member including a first elongated arm and a wheel receptacle, the first securing member being configured to be inserted into the first elongated groove, the received portion of the first securing member being slidingly moveable to a selectable position in the first elongated groove; and a first attachment mechanism, the first attachment mechanism being configured to secure the first securing member to the first elongated groove.

In another illustrative embodiment, a system for securing cargo to a tailgate of an automotive vehicle includes: a first elongated frame member, the first elongated frame member being configured to be removably connectable to a dropdown tailgate of an automotive vehicle; a first anchor, the first anchor including a first bracket and a first fastener, the first anchor being configured to be attachable to the dropdown tailgate of an automotive vehicle at a first anchor position of the automotive vehicle; and a first cargo securing member, the first cargo securing member being configured to be removably attachable to the first elongated frame member at a selectable position along the first elongated frame member via a first attachment mechanism. The first cargo securing member, first elongated frame member, and first anchor are cooperatively configurable to provide load-bearing support to at least one item of cargo carried by the tailgate when the tailgate is in a horizontal load-bearing position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings indicate like elements.

DETAILED DESCRIPTION

Figure 1:
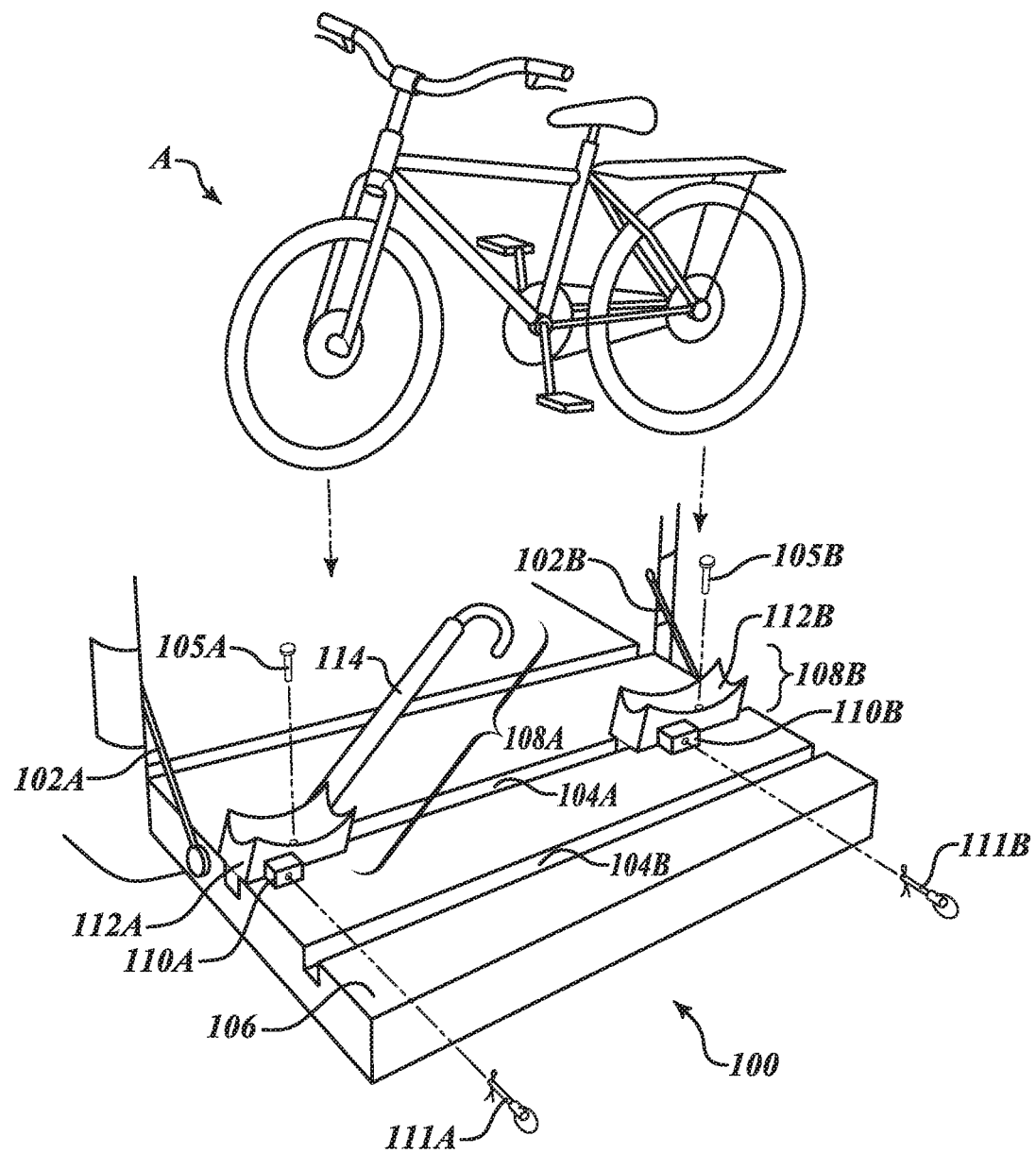
FIG. 1 is a perspective view of an illustrative dropdown tailgate system of a pickup truck for securing a bicycle to the tailgate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an illustrative system for securing a bicycle or other cargo to an automotive vehicle according to an example of the disclosure. In operation, the system permits a bicycle A (shown for illustrative purposes only and not as part of the illustrative system) to be secured to a tailgate of a vehicle for transport and then removed at a destination. As shown in FIG. 1, a tailgate 100, which may deployed to a horizontal load-bearing position supported by cables 102A, 102B or other suitable means includes a first elongated groove 104A and a second elongated groove 104B that are built into the tailgate 100 (integrated into the tailgate structure) and running, e.g., transversely, along the length of an inner panel 106 of the tailgate 100.

In the illustrative embodiment, the first elongated groove 104A and the second elongated groove 104B are configured to slidingly receive securing members that may be slid to a desired location in the groove and then fixed in place with fasteners so that cargo may be affixed to the securing members. In the example illustrated, the first elongated groove 104A may receive a first cargo-securing member 108A and a second cargo-securing member 108B. The grooves 104A and 104B have a cross-sectional shape, e.g., a dovetail cross-section or other flared shape whose width increases with depth into the tailgate 100, or a rectangular cross-section, or other cross-section. The bases (or tongues) of securing members 108A and 108B have complementary shapes to the grooves 104A and 104B in order to mate with the grooves 104A and 104B. Fasteners 105A and 105B, e.g., threaded bolts, may pass through associated holes in the securing members and into any of a series of spaced apart threaded holes in at the base of grooves 104A and 104B in tailgate 100. Alternatively, for grooves with a cross-sectional shape that is wider at the bottom of the groove 104A, 104B, such as a dovetail or other flared shape, the holes in securing members 108A, 108B may themselves be threaded, such that, when positioned in grooves 104A, 104B, the fasteners 105A, 105B may be tightened so as to slightly raise securing members 108A, 108B in grooves 104A, 104B and clamp them in the grooves 104A, 104B via friction with the grooves 104A, 104B. Alternatively or in addition, fastening may also be provided by locking mechanisms 110A and 110B attached to securing members 108A, 108B, via fastening pins (e.g., cotter pins) 111A, 111B, wherein locking mechanisms 110A, 110B may include, e.g., levers which when rotated to a locking position drive a cam at the bottom of securing members 108A, 108B that may protrude slightly from the bottom securing members 108A, 108B when rotated to slightly raise the securing members upward relative to the groove 104A, 104B to clamp securing members 108A, 108B into grooves 104A, 104B via friction with upper portions of grooves 104A, 104B. Rotating the levers of locking mechanisms 110A, 110B back to a release position lowers the securing members 108A, 108B in grooves 104A, 104B so as to relieve the friction with the grooves 104A, 104B. Other means of fastening may also be used, such as a lever mechanism, which when rotated to a locking position, creates slight expansion of the base (tongue) of the securing member 108A, 108B so as to provide clamping via friction with the groove 104A, 104B (e.g., utilizes an expansion clamp).

Due to the complementary shapes of the elongated grooves 104A, 104B and the received securing members 108A, 108B, movement of the received securing members 108A, 108B (when not yet fastened) is restrained to the direction along the grooves 104A, 104B. The elongated grooves 104A, 104B and securing members 108A, 108B may be constructed of materials suitable to withstand the expected forces including shear and torsional forces associated with the normal acceleration and deceleration of an automotive vehicle relative to the bicycle or other cargo given its weight and dimensions. For example, the elongated grooves 104A, 104B and securing members 108A, 108B may be formed of aluminum alloy, steel, other metal alloys, plastic, composite material, or other materials possessing suitable strength and durability for the expected forces bicycles or cargo weighing, e.g., 25 or more pounds, e.g., 25-50, 50-75, 75-100, or more pounds, for instance. The material chosen may also provide weather resistance. For example, stainless steel, reinforced plastic, or composite materials may be used to protect against rain and snow. In certain embodiments, for example, the one or both elongated grooves may comprise tailgate panel material. In certain embodiments, for example, the elongated grooves may comprise durable and/or reinforcing inserts (for example a metal insert) that are fixedly integrated into the tailgate 100 to provide grooves 104A, 104B formed at the tailgate panel 106.

As shown, the first elongated groove 104A receives a first member 108A and a second member 108B, each of which may be adjustably positioned relative to one another (for example with a relative spacing along the first elongated groove 102A to match the wheelbase of a bicycle) and secured with locking mechanisms 110A and 110B, respectively. Each of the first and second members (108A and 108B) comprise first and second wheel receptacles (112A and 112B, respectively) having rigid curvatures, whereby the front wheel of a bicycle may be received by the first wheel receptacle 112A and the rear wheel of the bicycle may be received by the second wheel receptacle 112B. The first securing member 108A further may comprise an arm 114 to immobilize the front wheel the of a bicycle and to provide a structure to which the bicycle may be secured with suitable cords, straps, elastic bands, etc. Second securing member 108B may also include an arm, if desired, to which the bicycle may be secured with suitable cords, straps, elastic bands, etc. Both securing members 108A, 108B may include straps with buckles attached thereto which may be used to wrap around and secure the portions of bicycle tires in contact with the curved portions of the securing members 108A, 108B. Once positioned, the first and second securing members 108A and 108B are secured into position by fasteners 105A, 105B and/or locking mechanisms 110A, 110B, such as previously described herein. The first and second securing members 108A and 108B, when positioned and fastened in place, secure and limit movement of an attached bicycle or other cargo along and about all directions of motion. In addition, one or more locking straps or other locking mechanism (not shown) may be used, e.g., attached to the vehicle bumper, to fix the tailgate 100 in a locked horizontal position when the cargo securing system is being used, e.g., to prevent the tailgate from bouncing up and down during driving.

While FIG. 1 describes an illustrative embodiment, other variations fall within scope of the disclosure. For example, the system may include, in addition to first and/or second elongated grooves 104A, 1094B, an elevated rail system for securing cargo, such as described further below with reference to FIG. 3. In another example, the cross-sectional shape of the first and/or second elongated grooves 104A, 104B may be that of an inverted "tee" (i.e., inverted "T" shape). In another example, the first wheel receptacle 112A and/or the second wheel receptacle 112B may include U-shaped arms that extend from one or both sides that rotate and lock into selectable positions, e.g., with cotter pins or spring-loaded protruding buttons into order to snugly accommodate bicycle wheels of different sizes. In another example, the first wheel receptacle 112A (and/or the second wheel receptacle 112B) may be flexible and expandable to accommodate bicycle wheels of different sizes. In another example, the tailgate 100 may be supported in the horizontal position by limiter arms instead of tailgate cables 102A, 102B, or may be supported in the horizontal position at a hinge location via another motion-limiting structure without cables or limiter arms.

Figure 2:
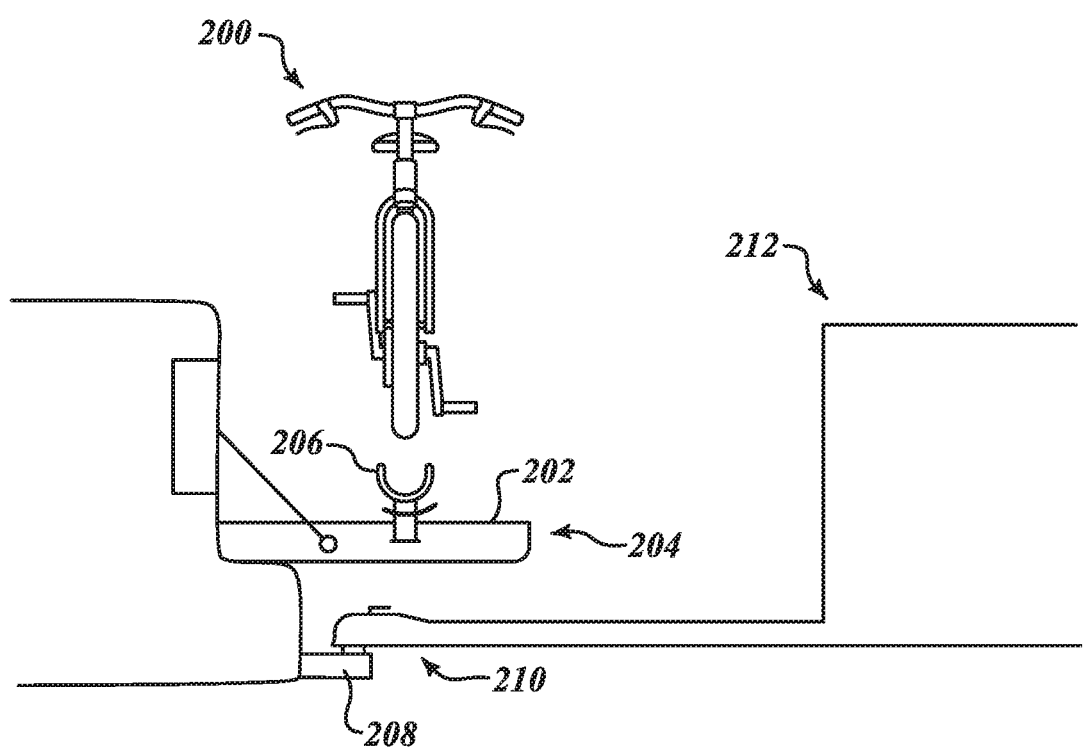
FIG. 2 is a side plan view of an illustrative dropdown tailgate system for securing cargo to the tailgate.

FIG. 2 depicts an illustrative approach to securing a bicycle to an inner panel of a tailgate of a pickup truck while maintaining cargo space in a truck bed and towing a trailer. As shown in FIG. 2, a bicycle 200 is secured upright to an inner panel 202 of a dropdown tailgate 204 deployed in a horizontal load-bearing position via bicycle cups including a front bicycle cup 206. At the same time, the trailer hitch 208 has unobstructed access to a trailer hitch tongue 210 connected to a trailer 212, and a cargo area of a truck bed is available for receiving other cargo.

Figure 3:
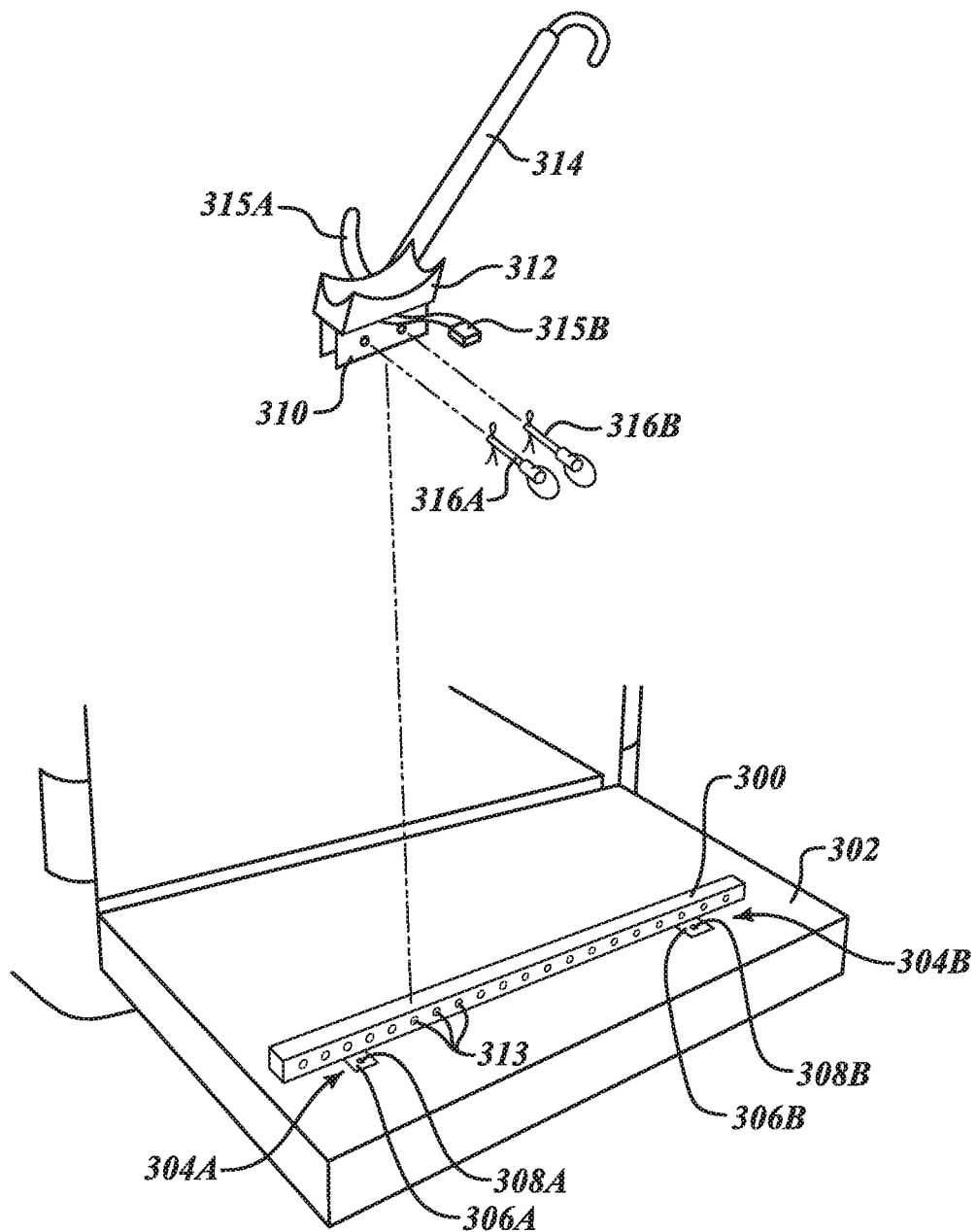
FIG. 3 is an exploded perspective view of an illustrative system attachable to a dropdown tailgate of a truck for securing a bicycle to an inner panel of the tailgate.

FIG. 3 illustrates an illustrative system for securing cargo to a tailgate of an automotive vehicle for carrying cargo or passengers. As shown in FIG. 3, an elongated frame member 300 is anchored to a tailgate 302 by anchors 304A, 304B positioned at pre-determined positions. The anchors 304A, 304B may comprise brackets 306A, 306B that attach (e.g., removably attach) the elongated frame member 300 to the tailgate 302 via fasteners 308A, 308B, such as, e.g., cotter pins, threaded bolts, clamps, etc. The elongated frame member 300 may be removably connectable to the tailgate 302 via the brackets 306A, 306B of anchors 304A, 30B. The system further includes a cargo securing member 310, e.g., a U-channel bracket with holes to accept fastening pins (e.g., cotter pins) 316 A, 316B (shown here connected to a bicycle carrier 312) which is removably attachable to the elongated frame member 300 at one of plural available positions via holes 313 in the elongated frame member 300. The cargo securing member 310, e.g., configured for a bicycle in the example of FIG. 3, may include a wheel receptacle 312, and arm 314 to which the bicycle or cargo may be further attached with straps, ties, bands, etc., and may include an integrated strap 315A and buckle 315B to wrap around and secure the base of the wheel in contact with the wheel receptacle 312. Two or more such cargo securing members 310 may be used.

The components of the illustrative system illustrated in FIG. 3, including but not limited to the elongated frame member, anchors, and cargo securing member may be constructed of any combination of materials suitable to withstand the expected forces, including shear and torsional forces associated with the normal acceleration and deceleration of an automotive vehicle relative to the cargo and the carrier given their weight and dimensions. Such materials may include aluminum alloy, steel, other metal alloys, plastic, composite material, or other materials possessing suitable strength and durability for the expected forces bicycles or cargo weighing, e.g., 25 or more pounds, e.g., 25-50, 50-75, 75-100, or more pounds, for instance.

The complementary cross-sections of the elongated frame member 300 and the cargo securing member 310 may be any of the cross-sections described elsewhere in the disclosure. For example, the elongated frame member 300 may be a solid rail with a dovetail shape, the narrow portion of which being disposed toward the tailgate and the wide end of which being disposed away from the tailgate. In that case, the securing member 310 may have complementary dovetail groove that rides on the dovetail rail. As another example, the elongated frame member 300 may be a solid rail with a T-shape, the narrow portion of which being disposed toward the tailgate and the wide end of which being disposed away from the tailgate. In that case, the securing member 310 may have complementary T-shaped groove that rides on the T-shaped rail. In such cases, the each securing member 310 may be provided with an attachment mechanism in the form of a compression clamp operable by a lever that compresses the securing member 310 onto the dovetail-shaped or T-shaped rail 300 to fix the securing member 310 in place on the rail 300 by friction. Also, the illustrative embodiment illustrated in FIG. 3 shows the cargo securing member 310 connectable via the elongated frame member 300 at discrete available positions given by holes 313, but alternative configurations are contemplated. For example, the cargo securing member 310 may be configured to continuously slide along elongated frame member (rail) 300 and be locked into place at any position along the length of the elongated frame member 300, for example by one of the locking mechanisms described above and elsewhere in the disclosure. The illustrative embodiment illustrated in FIG. 3 shows a cargo carrier 310 configured for a bicycle, but alternative configurations are contemplated, e.g., for securing coolers or other containers.

In view of the above, it will be appreciated that the disclosure describes an illustrative system for securing cargo to a dropdown tailgate of an automotive vehicle, the automotive vehicle being configured for carrying cargo or passengers, wherein the system includes: a dropdown tailgate including a first elongated groove running along an inner panel of the dropdown tailgate; a first securing member, the first securing member including a first elongated arm; the first securing member being configured to be inserted into the first elongated groove, the received portion of the first securing member being slidingly moveable to a selectable position in the first elongated groove; and a first attachment mechanism, the first attachment mechanism being configured to secure the securing member to the first elongated groove.

The system may possess various illustrative features. For example, a cross-sectional shape of the first elongated groove may be complementary to a cross-sectional shape of the portion of the first elongated arm. The first securing member and the first elongated arm may be configured to secure a bicycle. The first attachment mechanism may comprise, e.g., at least one of a fastening pin, a threaded bolt, an expansion clamp, and a compression clamp, and other types of fasteners. The illustrative system does not impede horizontal access to a trailer hitch disposed below the dropdown tailgate when the dropdown tailgate is in a horizontal orientation. The system may include a second securing member including a second elongated arm member, the first elongated groove being configured to receive a portion of the second securing member, the received portion of the second securing member being slidingly moveable to another selectable position in the first elongated groove. The system may include a second elongated groove, the second elongated groove running parallel to the first elongated groove along the inner panel of the dropdown tailgate.

It further will be appreciated that the disclosure describes an illustrative system for securing a bicycle to a dropdown tailgate of an automotive vehicle, the automotive vehicle being configured for carrying cargo or passengers. The system includes a dropdown tailgate including a member having a first elongated groove, the first elongated groove running transversely along an inner panel of the dropdown tailgate; a first securing member for securing a first wheel of a bicycle, the first securing member including a first elongated arm and a wheel receptacle, the first securing member being configured to be inserted into the first elongated groove, the received portion of the first securing member being slidingly moveable to a selectable position in the first elongated groove; and a first attachment mechanism, the first attachment mechanism being configured to secure the first securing member to the first elongated groove.

It further will be appreciated that the disclosure describes an illustrative system for securing cargo to a tailgate of an automotive vehicle, the automotive vehicle being configured for carrying cargo or passengers. The system includes: a first elongated frame member, the first elongated frame member being configured to be removably connectable to a dropdown tailgate of an automotive vehicle; a first anchor, the first anchor including a first bracket and a first fastener, the first anchor being configured to be attachable to the dropdown tailgate of an automotive vehicle at a first anchor position of the automotive vehicle; and a first cargo securing member, the first cargo securing member being configured to be removably attachable to the first elongated frame member at a selectable position along the first elongated frame member via a first attachment mechanism, the first cargo securing member, first elongated frame member, and first anchor being cooperatively configurable to provide load-bearing support to at least one item of cargo carried by the tailgate when the tailgate is in a horizontal load-bearing position.

The system may possess various illustrative features. For example, the first elongated frame member may be configured to be removably connectable to the first anchor via a first connection mechanism. A cross-sectional shape of the first elongated frame member may be complementary to a cross-sectional shape of the first cargo securing member, the first elongated frame member including one or more surfaces that constrains movement of the first cargo securing member in at least a first direction when the first elongated frame member and the first cargo securing member are removably attached. The first attachment mechanism may comprise one or more of a fastening pin, a threaded bolt, an expansion clamp, and a compression clamp, and other types of fasteners. The system may comprise a second anchor, the second anchor being configured to be attachable to the tailgate at a second anchor position; a second elongated frame member, the second elongated frame member being configured to be removably connectable to the tailgate via the second anchor; and a second cargo securing member, the second cargo securing member being configured to be removably attachable to the second elongated frame member at another selectable position of the second elongated frame member via a second attachment mechanism. The first cargo securing member and the second cargo securing member may be collinearly configurable to secure a single item of cargo to the tailgate.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

While the present disclosure has been described in terms of illustrative embodiments, it will be understood by those skilled in the art that various modifications can be made thereto without departing from the scope of the claimed subject matter as set forth in the claims.

What is claimed is:

1. A system for securing cargo to a dropdown tailgate of an automotive vehicle, the automotive vehicle being configured for carrying cargo or passengers, the system comprising:
   a dropdown tailgate including a first elongated groove running along an inner panel of the dropdown tailgate;
   a first securing member, the first securing member including a first elongated arm, the first securing member being configured to be inserted into the first elongated groove, the received portion of the first securing member being slidingly moveable to a selectable position in the first elongated groove; and
   a first attachment mechanism, the first attachment mechanism being configured to secure the securing member to the first elongated groove.

2. The system of claim 1, wherein a cross-sectional shape of the first elongated groove is complementary to a cross-sectional shape of the portion of the first elongated arm.

3. The system of claim 1, wherein the first securing member and the first elongated arm are configured to secure a bicycle.

4. The system of claim 1, wherein the first attachment mechanism includes at least one of a fastening pin, a threaded bolt, an expansion clamp, and a compression clamp.

5. The system of claim 1, wherein the system does not impede horizontal access to a trailer hitch disposed below the dropdown tailgate when the dropdown tailgate is in a horizontal orientation.

6. The system of claim 1, further comprising a second securing member including a second elongated arm member, the first elongated groove being configured to receive a portion of the second securing member, the received portion of the second securing member slidingly moveable to another selectable position in the first elongated groove.

7. The system of claim 1, further comprising a second elongated groove, the second elongated groove running parallel to the first elongated groove along the inner panel of the dropdown tailgate.

8. A system for securing a bicycle to a dropdown tailgate of an automotive vehicle, the automotive vehicle being configured for carrying cargo or passengers, the system comprising:
   a dropdown tailgate including a member having a first elongated groove, the first elongated groove running transversely along an inner panel of the dropdown tailgate;
   a first securing member for securing a first wheel of a bicycle, the first securing member including a first elongated arm and a wheel receptacle, the first securing member being configured to be inserted into the first elongated groove, the received portion of the first securing member being slidingly moveable to a selectable position in the first elongated groove; and
   a first attachment mechanism, the first attachment mechanism being configured to secure the first securing member to the first elongated groove.

9. The system of claim 8, wherein a cross-sectional shape of the first elongated groove is complementary to a cross-sectional shape of the portion of the first elongated arm.

10. The system of claim 8, wherein the first attachment mechanism includes at least one of a fastening pin, a threaded bolt, an expansion clamp, and a compression clamp.

11. The system of claim 8, wherein the system does not impede horizontal access to a trailer hitch disposed below the dropdown tailgate when the dropdown tailgate is in a horizontal orientation.

12. The system of claim 8, further comprising a second securing member including a second elongated arm member, the first elongated groove being configured to receive a portion of the second securing member, the received portion of the second securing member slidingly moveable to another selectable position in the first elongated groove.

13. The system of claim 8, further comprising a second elongated groove, the second elongated groove running parallel to the first elongated groove along the inner panel of the dropdown tailgate.

14. A system for securing cargo to a tailgate of an automotive vehicle, the automotive vehicle being configured for carrying cargo or passengers, the system comprising:
 a first elongated frame member, the first elongated frame member being configured to be removably connectable to a dropdown tailgate of an automotive vehicle;
 a first anchor, the first anchor including a first bracket and a first fastener, the first anchor being configured to be attachable to the dropdown tailgate of an automotive vehicle at a first anchor position of the automotive vehicle; and
 a first cargo securing member, the first cargo securing member being configured to be removably attachable to the first elongated frame member at a selectable position along the first elongated frame member via a first attachment mechanism,
 the first cargo securing member, first elongated frame member, and first anchor being cooperatively configurable to provide load-bearing support to at least one item of cargo carried by the tailgate when the tailgate is in a horizontal load-bearing position.

15. The system of claim 14, wherein the first elongated frame member is configured to be removably connectable to the first anchor via a first connection mechanism.

16. The system of claim 14, wherein a cross-sectional shape of the first elongated frame member is complementary to a cross-sectional shape of the first cargo securing member, the first elongated frame member including one or more surfaces that constrains movement of the first cargo securing member in at least a first direction when the first elongated frame member and the first cargo securing member are removably attached.

17. The system of claim 14, wherein the first attachment mechanism includes one or more of a fastening pin, a threaded bolt, an expansion clamp, and a compression clamp.

18. The system of claim 14, further comprising:
 a second anchor, the second anchor being configured to be attachable to the tailgate at a second anchor position;
 a second elongated frame member, the second elongated frame member being configured to be removably connectable to the tailgate via the second anchor; and
 a second cargo securing member, the second cargo securing member being configured to be removably attachable to the second elongated frame member at another selectable position of the second elongated frame member via a second attachment mechanism.

19. The system of claim 18, wherein the first cargo securing member and the second cargo securing member are collinearly configurable to secure a single item of cargo to the tailgate.

20. The system of claim 14, wherein the first cargo securing member and the first elongated frame member are configured to secure a bicycle.

\* \* \* \* \*